United States Patent Office 3,631,082
Patented Dec. 28, 1971

3,631,082
NOVEL PROCESS FOR PREPARING SULFUR-CONTAINING ORGANOTIN COMPOUNDS
Kenichi Kino, Amagasaki-shi, Takashi Matsuzaki, Osaka-fu, and Hiroshi Ichikawa, Amagasaki-shi, Japan, assignors to Nitto Kasei Co., Ltd., Osaka, Japan
No Drawing. Filed Sept. 15, 1969, Ser. No. 858,158
Claims priority, application Japan, Sept. 13, 1969, 44/65,991
Int. Cl. C07f 7/22
U.S. Cl. 260—429.7
2 Claims

ABSTRACT OF THE DISCLOSURE

Sulfur-containing organotin compounds of the formula $$R_2Sn[S(CH_2)_nCOOR']_2$$

wherein R is a 1–18 C hydrocarbon radical, R' is a 1–18 C hydrocarbon radical, or an alkoxyalkyl radical, and $n$ is 1 or 2 may be prepared by the reaction of a di-substituted organotin oxide with a mercapto acid ester in the presence of a dehydrating agent.

---

This invention relates to a process for preparing sulfur-containing organotin compounds having therein carboxylic acid ester (—COOR') groups, represented by the formula $$R_2Sn[S(CH_2)_nCOOR']_2 \quad [I]$$

wherein R is a hydrocarbon radical of 1–18 carbon atoms, R' is a hydrocarbon radical of 1–18 carbon atoms, or alkoxyalkyl, and $n$ is an integer from 1 to 2 inclusive. These compounds are useful stabilizers for resins such as polyvinyl chloride, acrylonitrile - butadiene - styrene terpolymer, etc.

Various methods have been attempted to make these compounds. A method according to the following equation is known as simple and the product low-priced.

$$R_2SnO + 2HS(CH_2)_nCOOR' \rightarrow [I] + H_2O$$

in which R, R' and $n$ are as above defined. The method comprises reacting in the presence of a hydrocarbon solvent such as benzene, toluene, xylene, cyclohexane, n-hexane, etc. and removing the water of reaction by azeotropic distillation. However, it is not satisfactory. For instance, as illustrated by a chain of reaction equations:

$$R_2SnO + 2HS(CH_2)_nCOOR' \longrightarrow [I] + H_2O$$
$$HS(CH_2)_nCOOR' + H_2O \longrightarrow HS(CH_2)_nCOOH + R'OH$$

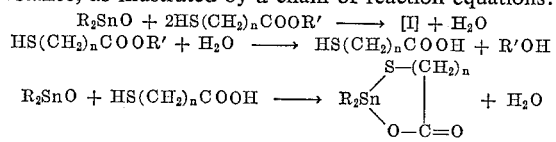

one of the raw materials mercapto acid ester is readily hydrolyzed by the water formed to yield acid and alcohol particularly under heat; and the mercapto acid which results reacts with the other of the raw materials organotin oxide to produce the by-product. Further in this method, as illustrated by a chain of reaction equations:

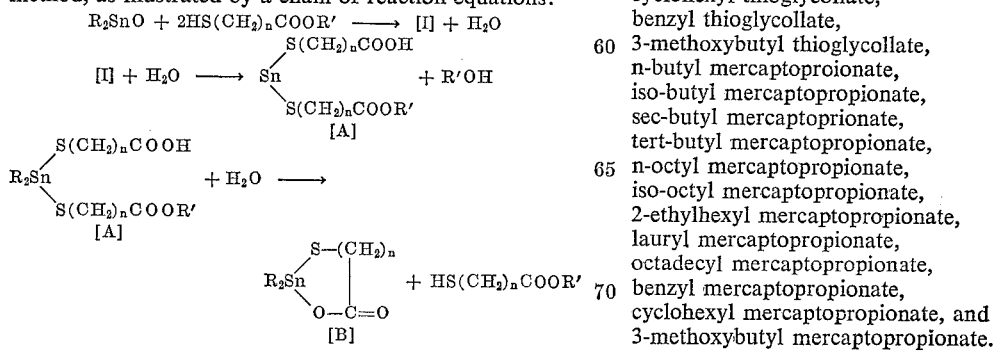

the end product [I] once obtained is hydrolyzed by the water formed; and the resultant compound [A] is reacted further with the water to produce the by-product [B]. In the above formulae, R, R' and $n$ have the same meanings as stated above.

Often these by-products are observed as a precipitate separated from the reaction mixture, and the unreacted and the liberated mercapto acid ester is left as residue. Therefore, the compound represented by the Formula I is not uniform in quality in this method, and the use of such product brings about various unfavorable side effects.

Now, we have found that the sulfur-containing organotin compound can be obtained without such by-product contained therein.

In accordance with certain of its aspects this invention relates to a process for preparing a sulfur-containing organotin compound having therein two carboxylic acid ester groups (—COOR'), represented by the formula $$R_2Sn[S(CH_2)_nCOOR']_2$$

wherein R is a hydrocarbon radical of 1–18 carbon atoms, R' is a hydrocarbon radical of 1–18 carbon atoms, or alkoxyalkyl, and $n$ is an integer from 1 to 2 inclusive which comprises reacting a di-substituted organotin oxide compound of the formula $$R_2SnO$$

wherein R is as above defined with a mercapto acid ester compound of the formula $$HS(CH_2)_nCOOR'$$

wherein R' and $n$ are as above defined in the presence of a dehydrating agent.

As starting material there are used di-substituted organotin oxides of the formula $R_2SnO$ wherein R is as above defined, for example dimethyltin oxide,
diethyltin oxide,
di-n-propyltin oxide,
di-iso-propyltin oxide,
di-n-butyltin oxide,
di-iso-butyltin oxide,
di-sec-butyltin oxide,
di-n-amyltin oxide,
di-iso-amyltin oxide,
di-n-octyltin oxide,
di-iso-octyltin oxide,
di-2-ethylhexyltin oxide,
dilauryltin oxide,
dicyclohexyltin oxide,
diphenyltin oxide, and
dibenzyltin oxide.

As other starting material there are used mercapto acid esters of the formula $HS(CH_2)_nCOOR'$ wherein R' and $n$ are as above defined, for example n-butyl thioglycollate,
iso-butyl thioglycollate,
sec-butyl thioglycollate,
tert-butyl thioglycollate,
n-octyl thioglycollate,
iso-octyl thioglycollate,
2-ethylhexyl thioglycollate,
lauryl thioglycollate,
dodecyl thioglycollate,
cyclohexyl thioglycollate,
benzyl thioglycollate,
3-methoxybutyl thioglycollate,
n-butyl mercaptoproionate,
iso-butyl mercaptopropionate,
sec-butyl mercaptoprionate,
tert-butyl mercaptopropionate,
n-octyl mercaptopropionate,
iso-octyl mercaptopropionate,
2-ethylhexyl mercaptopropionate,
lauryl mercaptopropionate,
octadecyl mercaptopropionate,
benzyl mercaptopropionate,
cyclohexyl mercaptopropionate, and
3-methoxybutyl mercaptopropionate.

Dehydrating agents that can be employed in the practice of this invention may be any compounds that are usually used as desiccants of organic compounds. Suitable desiccants are disclosed in the chemical literature, e.g. Technique of Organic Chemistry, volume VII; A. Weissberger et al. (ed.) Interscience Publishers Incorporated, New York (1955), pp. 289–294. Preferably used are those which exhibit neutral. Specific dehydrating agents operable in the practice of this invention include sodium sulfate, calcium sulfate, copper sulfate, magnesium sulfate, aluminum sulfate, potassium carbonate, calcium oxide, barium oxide, aluminum oxide, calcium chloride, magnesium chloride, zinc chloride, and silica gel.

The di-substituted organotin oxide and the mercapto acid ester, starting materials employed in the process of this invention may be mixed in stoichiometric amount to obtain the end product, compounds of foregoing Formula I. The reaction may be carried out in the excess amount of one of the two starting materials; however, it is preferred that they are mixed in as closely stoichiometric mole ratio as possible.

The dehydrating agent may be used in the amount within the range of about 0.1–10 moles per mole of the disubstituted organotin oxide. The preferred amount used is an excess though it varies depending upon dehydrating ability and effect of the dehydrating agent.

Reaction temperatures may be within the range of 10°–100° C. in the reaction between the two starting materials in the presence of such dehydrating agents. High purity products may be obtained in high yield in this temperature range. Since heating at higher temperatures and the absence of dehydrating agents cause hydrolysis of the starting materials and the product and therefore cause formation of by-products, precipitates, etc., heating should be minimum. According to this invention, for instance, the reaction may be carried out at room temperature or at a little higher temperature. This is great advantage of this invention. Heating at reflux temperature has been must in prior art techniques in which the reaction is carried out in the absence of dehydrating agents.

The reaction may be complete in a relatively short space of time. A suitable reaction time range is 1–5 hours.

The reaction may be carried out in the presence (or absence) of inert solvent or diluents. Inert solvents or diluents are used merely with a view to easy reaction proceeding in this invention. Therefore, any solvents or diluents may be used that do not react with the reactants. A convenient treatment after reaction being considered, those preferred may be of lower boiling point, e.g. 10°–150° C., preferably 10°–100° C. Suitable inert solvents or diluents include an inert aliphatic hydrocarbon, e.g. n-hexane, n-heptane, n-octane, iso-octane, ligroin, petroleum ether, etc., a cycloaliphatic hydrocarbon, e.g. cyclohexane, methyl cyclohexane, cycloheptane, cyclooctane, etc., an aromatic hydrocarbon, e.g. benzene, toluene, xylene, solvent naphthas, etc., and a chlorinated hydrocarbon, e.g. methylene dichloride, chloroform, carbon tetra-chloride, trichloroethylene, ethylene dichloride, etc. The amount used may be 0.5–5 times (by weight) of the di-substituted organotin oxide.

Specific examples of the sulfur-containing organotin compounds which are within the scope of this invention include, among others, the following:

Dimethyltin bis(n-butyl thioglycollate)
Dimethyltin bis(n-dodecyl thioglycollate)
Diethyltin bis(benzyl thioglycollate)
Diethyltin bis(cyclohexyl mercaptopropionate)
Di-n-propyltin bis(iso-butyl thioglycollate)
Di-n-butyltin bis(n-butyl thioglycollate)
Di-n-butyltin bis(iso-octyl thioglycollate)
Di-n-butyltin bis(2-ethylhexyl thioglycollate)
Di-n-butyltin bis(lauryl thioglycollate)
Di-n-butyltin bis(3-methoxybutyl thioglycollate)
Dibutyltin bis(n-butyl mercaptopropionate)
Dibutyltin bis(iso-octyl mercaptopropionate)
Dibutyltin bis(n-octadecyl mercaptopropionate)
Dibutyltin bis(benzyl mercaptopropionate)
Dioctyltin bis(ethyl thioglycollate)
Dioctyltin bis(n-butyl thioglycollate)
Dioctyltin bis(iso-octyl thioglycollate)
Dioctyltin bis(2-ethylhexyl thioglycollate)
Dioctyltin bis(cyclohexyl thioglycollate)
Dioctyltin bis(3-methoxybutyl thioglycollate)
Dioctyltin bis(n-butyl mercaptopropionate)
Dioctyltin bis(iso-octyl mercaptopropionate)
Dioctyltin bis(lauryl mercaptopropionate)
Dioctyltin bis(benzyl mercaptopropionate)
Dilauryltin bis(n-butyl thioglycollate)
Dilauryltin bis(cyclohexyl thioglycollate)
Dibenzyltin bis(benzyl mercaptopropionate)

The sulfur-containing organotin compounds produced by the practice of this invention may be obtained as pure substances or in the form of liquid. When the product is liquid, solvents may preferably be removed by vacuum distillation. The thus obtained sulfur-containing organotin compounds may be a viscous liquid of high purity having substantially no odor, and the yields may be substantially quantitative. Since the compound has the ester groups in its molecule, various types of stabilizers may be made by varying the groups.

The sulfur-containing organotin compounds produced by the practice of this invention may contain substantially no impurities and always uniform products in purity and quality may be obtained. Accordingly, these may be excellent stabilizers for polyvinyl chloride resins and finished articles of even quality may be obtained. Further they may have good compatibility with resins.

This invention is illustrated by the following examples:

EXAMPLE 1

Di-n-octyltin oxide (361 gms., 1.0 mol), iso-octyl thioglycollate (409 gms., 2.0 mols), anhydrous sodium sulfate (140 gms.), and benzene (600 cc.) were charged into a reaction vessel equipped with a stirrer and stirred 4 hours at 35°–40° C. (exotherm occurred, and heating was not necessary). After the reaction was complete, the reaction mixture was filtered. The dehydrating agent (sodium sulfate) which absorbed the water formed during the reaction was washed with a solvent, and the solution was added to the filtrate. The filtrate was distilled at reduced pressure to remove the solvent. A clear liquid, di-n-octyltin bis(iso-octyl thioglycollate)

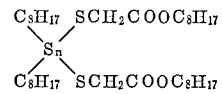

was obtained quantitatively.

The thus obtained di-n-octyltin bis(iso-octyl thioglycollate) was perfectly transparent, and no precipitate was observed. Upon infrared spectroscopic analysis of the product the band at 6.3–6.5μ attributed to the tin-organic acid linkage (Sn—OOC—) was not observed.

A control was made by reacting the same reactants in the presence of azeotrope former (benzene) and without the use of any dehydrating agents. Precipitates were not formed. However, upon infrared spectroscopic analysis of the control the identifiable band due to the tin-organic acid linkage (Sn—OOC—) was observed at 6.3–6.5μ, which indicates that the iso-octyl thioglycollate underwent hydrolysis.

The product di-n-octyltin bis(iso-octyl thioglycollate) produced with use of the dehydrating agent has the following analysis:

Specific gravity $d_4^{30}$: 1.076
Refractive index $n_D^{30}$: 1.4980
Sn content: 15.59% (calc. 15.79%)
S content: 8.43% (calc. 8.53%)

EXAMPLE 2

Di-n-butyltin oxide (249 gms., 1.0 mol), iso-octyl thioglycollate (409 gms., 2.0 mols), dehydrating agent anhydrous sodium sulfate (230 gms.), and solvent benzene (500 cc.) were charged into a reaction vessel equipped with a stirrer and were reacted 4 hours at 30°–35° C. The obtained reaction mixture was filtered and the filtrate was distilled at reduced pressure to remove the solvent. A clear liquid, di-n-butyltin bis(iso-octyl thioglycollate)

$$\begin{array}{c} C_4H_9 \\ \diagdown \\ Sn \\ \diagup \\ C_4H_9 \end{array} \begin{array}{c} SCH_2COOC_8H_{17} \\ \\ SCH_2COOC_8H_{17} \end{array}$$

was obtained quantitatively. The product was perfectly transparent, and no precipitate was observed. Upon infrared spectroscopic analysis of the product the band at 6.3–6.5μ due to tin-organic acid linkage (Sn—OOC—) was not observed.

The thus obtained di-n-butyltin bis(iso-octyl thioglycollate) has the following analysis:

Specific gravity $d_4^{30}$: 1.189
Refractive index $n_D^{30}$: 1.5033
Sn content: 18.43% (calc. 18.56%)
S content: 9.99% (calc. 10.03%)

A control was made by reacting the same reactants in the presence of azeotrope former (benzene) and without the use of any dehydrating agents. Precipitates were formed. Upon infrared spectroscopic analysis of the control the identifiable band due to tin-organic acid linkage (Sn—OOC—) was observed at 6.3–6.5μ, which indicates that the iso-octyl thioglycollate underwent hydrolysis.

EXAMPLE 3

Di-n-butyltin oxide (249 gms., 1.0 mol), n-butyl-β-mercaptopropionate (325 gms., 2.0 mols), anhydrous magnesium sulfate (60 gms.), and n-hexane (400 cc.) were reacted 3 hours at 40°–45° C. The reaction mixture was filtered and the filtrate was distilled at reduced pressure to remove the solvent. A clear liquid, di-n-butyltin bis(butyl-β-mercaptopropionate)

$$\begin{array}{c} C_4H_9 \\ \diagdown \\ Sn \\ \diagup \\ C_4H_9 \end{array} \begin{array}{c} SCH_2CH_2COOC_4H_9 \\ \\ SCH_2CH_2COOC_4H_9 \end{array}$$

was obtained quantitatively.

Analysis

Specific gravity $d_4^{30}$: 1.210
Refractive index $n_D^{30}$: 1.4999
Sn content: 21.33% (calc. 21.37%)
S content: 11.54% (calc. 11.55%)

Upon infrared spectroscopic analysis of the product di-n-butyltin bis(butyl-β-mercaptopropionate) the band which indicates the presence of tin-organic acid linkage (Sn—OOC—) was not observed.

EXAMPLE 4

Di-n-octyltin oxide (361 gms., 1 mol), benzyl mercaptopropionate (393 gms., 2 mols), calcium chloride (110 gms.), and cyclohexane (600 cc.) were reacted 3 hours at 30°–35° C. to obtain quantitatively a clear liquid, di-n-octyltin bis(benzyl mercaptopropionate)

$$\begin{array}{c} C_8H_{17} \\ \diagdown \\ Sn \\ \diagup \\ C_8H_{17} \end{array} \begin{array}{c} SCH_2CH_2COOCH_2\text{—}C_6H_5 \\ \\ SCH_2CH_2COOCH_2\text{—}C_6H_5 \end{array}$$

Analysis

Specific gravity $d_4^{30}$: 1.093
Refractive index $n_D^{30}$: 1.4924
Sn content: 15.92% (calc. 16.13%)
S content: 8.70% (calc. 8.72%)

Upon infrared spectroscopic analysis the band due to tin-organic acid linkage (Sn—OOC—) was not observed.

EXAMPLE 5

Di-n-butyltin oxide (249 gms., 1 mol), 3-methoxybutyl thioglycollate (356 gms., 2 mols), anhydrous calcium sulfate (135 gms.), and benzene (500 cc.) were reacted 3 hours at 30°–35° C. to obtain quantitatively a clear liquid, di-n-butyltin bis(3-methoxybutyl thioglycollate)

$$\begin{array}{c} C_4H_9 \\ \diagdown \\ Sn \\ \diagup \\ C_4H_9 \end{array} \begin{array}{c} SCH_2COOCH_2CH_2CHCH_3 \\ \phantom{SCH_2COOCH_2CH_2CH}| \\ \phantom{SCH_2COOCH_2CH_2CH}OCH_3 \\ SCH_2COOCH_2CH_2CHCH_3 \\ \phantom{SCH_2COOCH_2CH_2CH}| \\ \phantom{SCH_2COOCH_2CH_2CH}OCH_3 \end{array}$$

Analysis

Specific gravity $d_4^{30}$: 1.188
Refractive index $n_D^{30}$: 1.5057
Sn content: 20.36% (calc. 20.21%)
S content: 10.81% (calc. 10.92%)

Upon infrared spectroscopic analysis the band due to tin-organic acid linkage (Sn—OOC—) was not observed.

Although this invention has been illustrated by reference to specific examples, numerous changes and modifications thereof which clearly fall within the scope of the invention will be apparent to those skilled-in-the-art.

What we claim is:

1. A process for preparing a sulfur-containing organotin compound having therein two carboxylic acid ester groups (—COOR'), represented by the formula $$R_2Sn[S(CH_2)_nCOOR']_2$$

wherein R is an alkyl radical of 1–18 carbon atoms or a cyclohexyl radical, R' is an alkyl, alkoxyalkyl, aryl, or aralkyl radical of 1–18 carbon atoms, and $n$ is an integer from 1 to 2 inclusive which comprises reacting a disubstituted organotin oxide compound of the formula $R_2SnO$ wherein R is as above defined with a mercapto acid ester compound of the formula $HS(CH_2)_nCOOR'$ wherein R' and $n$ are as above defined in the presence of a dehydrating agent.

2. The process of claim 1 wherein said dehydrating agent is selected from the group consisting of sodium sulfate, calcium sulfate, copper sulfate, magnesium sulfate, aluminum sulfate, potassium carbonate, calcium oxide, barium oxide, aluminum oxide, calcium chloride, magnesium chloride, zinc chloride, and silica gel.

References Cited
UNITED STATES PATENTS

| | | | |
|---|---|---|---|
| 2,731,484 | 1/1956 | Best | 260—429.7 |
| 2,789,102 | 4/1957 | Weinberg | 260—429.7 |
| 2,832,751 | 4/1958 | Weinberg et al. | 260—429.7 |

TOBIAS E. LEVOW, Primary Examiner

W. F. W. BELLAMY, Assistant Examiner